United States Patent [19]

McClaflin et al.

[11] Patent Number: 4,668,408
[45] Date of Patent: May 26, 1987

[54] COMPOSITION AND METHOD FOR TREATMENT OF WELLBORES AND WELL FORMATIONS CONTAINING PARAFFIN

[75] Inventors: Gifford G. McClaflin, Kay County, Okla.; Kang Yang, deceased, late of Kay County, Okla., by Kumsu Yang, executrix

[73] Assignee: Conoco Inc., Ponca City, Okla.

[21] Appl. No.: 745,472

[22] Filed: Jun. 17, 1985

Related U.S. Application Data

[63] Continuation-in-part of Ser. No. 616,884, Jun. 4, 1984, abandoned.

[51] Int. Cl.⁴ .............................................. E21B 37/06
[52] U.S. Cl. ................................ 252/8.552; 166/304; 252/8.3
[58] Field of Search ............ 166/304; 252/8.3, 8.55 B, 252/8.55 D

[56] References Cited

U.S. PATENT DOCUMENTS

| | | | |
|---|---|---|---|
| 2,927,078 | 3/1960 | Nathan | 252/8.3 |
| 3,241,614 | 3/1966 | Bertness | 166/304 |
| 3,481,870 | 12/1969 | Cheng et al. | 252/8.3 |

*Primary Examiner*—Herbert B. Guynn
*Attorney, Agent, or Firm*—Cortlan R. Schupbach

[57] ABSTRACT

Composition and method for treating wellbores and well formations to remove and inhibit accumulations of paraffin. The composition comprises a liquid mixture of a water soluble ethoxylated alkyl phenol and an alcohol containing one to four carbon atoms. Preferred are a water soluble nonoxynol having an average number of ethylene oxide units per molecule in the range of approximately 20 to 50 and methyl alcohol. The composition is circulated in the wellbore either continuously or in batch treatments.

11 Claims, No Drawings

4,668,408

COMPOSITION AND METHOD FOR TREATMENT OF WELLBORES AND WELL FORMATIONS CONTAINING PARAFFIN

This application is a continuation-in-part of U.S. patent application Ser. No. 616,884, filed June 4, 1984, now abandoned.

BACKGROUND OF THE INVENTION

1. Field of the Invention

This invention relates in general to the cleaning and treatment of wellbores and well formations and more particularly to such treatment for inhibiting and removing accumulations of paraffin.

2. Description of the Prior Art

During the production of petroleum or gas from a subterranean formation through a wellbore leading to the surface, one difficulty encountered is the accumulation of paraffin and heavy hydrocarbons within the wellbore. These accumulations most frequently occur at the producing formation and within the production tubing. The paraffin accumulations reduce the size of the passageways through which the oil or gas is produced so that the amount of oil or gas produced is restricted.

Various mechanical, thermal and chemical methods of treating wellbores for inhibiting and removing accumulations of paraffin have been utilized. Mechanical methods generally consist of scrapers which are moved through the wellbore to scrape the deposits from the tubing. Thermal methods comprise circulating hot oil or water through the wellbore to melt or increase the solubility of the paraffin deposits. The chemical methods comprise circulating solvents and wax crystal modifiers or paraffin dispersants through the wellbore.

A particular problem with the mechanical and thermal methods of removing paraffin deposits is that they are relatively expensive and require the well to be taken out of service during the treatment process.

Chemical methods for treating wellbores to inhibit and remove paraffin have also not been entirely satisfactory. Most importantly, some of the chemical solvents and dispersants can harm the producing formation by chemically changing the wettability of the formation or by reacting with the formation to form insoluble deposits which clog the formation. Moreover, some chemical treatments must be carefully tailored to suit the particular crude or paraffin with which they will be used.

SUMMARY OF THE INVENTION

It is an object of the present invention to provide an improved composition and method for treatment of wellbores or well formations to inhibit or remove paraffin.

It is also an object of the present invention to provide such compositions and methods which do not cause damage to the producing formation.

Another object of the present invention is to provide a more economical method of chemically treating wellbores or well formations to inhibit or remove paraffin deposits.

Still another object of the present invention is to provide a composition to be used in such a method which has a low freezing point so that it can be used year round.

In accordance with these objects the present invention provides an additive composition for circulating in a wellbore to inhibit and remove accumulations of paraffin therein. The composition comprises a liquid mixture of a water soluble alcohol containing 1 to 4 carbon atoms and a water soluble ethoxylated alkyl phenol. The ethoxylated alkyl phenol portion of the mixture is made water soluble by its mole ratio of ethylene oxide. For example, nonoxynol, a preferred ethoxylated alkyl phenol, must have an average number of ethylene oxide units per molecule greater than or equal to 9.5 in order to be water soluble.

The water solubility of the ethoxylated alkyl phenol portion of the mixture of the present invention is critical in order to prevent the mixture from changing the surfaces of the formation or tubing from water-wet to oil-wet when the composition contacts the formation and tubing. Of course, it is well known that oil-wet formations and tubings do not produce well.

Tests show that compositions in accordance with the present invention utilizing nonoxynol with an average number of ethylene oxide units per molecule in the range of 30 to 40 are most preferred.

The alcohol of the present invention synergistically cooperates with the water soluble ethoxylated alkyl phenol to prevent paraffin from adhering to the solid surfaces of the formation and the metal tubing. Particularly, the alcohol coacts with the water soluble ethoxylated alkyl phenol to maintain or alter the surfaces so that the surfaces are water wet and have a water shield to prevent waxy solids from depositing onto the surfaces. The action of the mixture of water soluble ethoxylated alkyl phenol and a water soluble alcohol to perform this task is much greater than either of the components acting separately.

The alcohol of the present invention also acts as an agent to reduce the freezing point of the mixture. This importantly allows the mixture to be used in extremely cold environments where paraffin deposits are often more troublesome. Finally, the alcohol also acts as a demulsifying agent cooperating with and enhancing the demulsification of paraffin produced by the water soluble ethoxylated alkyl phenol.

To protect the mixture of the present invention and the wellbore from bacterial attack it is desirable to add a bactericide to the mixture.

A method of the present invention comprises circulating the mixture of the present invention in the wellbore so as to inhibit or remove accumulations of paraffin. This can be accomplished either by continuous addition of small amounts of the mixture as the well is producing or by periodic additions of larger amounts of the mixture.

Another method of the present invention comprises squeeze treatment of the well formation using the mixture of the present invention. This includes pumping the mixture into the wellbore and pressurizing the mixture in the wellbore to force the mixture into the well formation.

For a further understanding of the invention and further objects, features and advantages thereof, reference may now be had to the following description of the preferred embodiments.

DESCRIPTION OF PREFERRED EMBODIMENTS

The composition of the present invention comprises a liquid mixture of a water soluble ethoxylated alkyl phenol and alcohol containing 1 to 4 carbon atoms. The mixture can also include a bactericide, a neutralizing or pH adjusting agent, water, and a corrosion inhibitor.

The water soluble ethoxylated alkyl phenol of the present invention can include mono-,di- or tri-alkyl phenolethylene oxide adducts. For example, ethylene oxide adducts of hexyl phenol, nonyl phenol, dodecyl phenol, octodecyl phenol, dibutyl phenol, didodecyl phenol and tributyl phenol are all satisfactory non-ionic surfactants provided the mole ratio of ethylene oxide is properly adjusted to make the ethoxylated alkyl phenol water soluble. Roughly, if the molecular weight of the ethylene oxide portion of the molecule is 65% of the combined molecular weight of the alkyl phenol portion of the molecule the ethoxylated alkyl phenol will be water soluble.

A preferred ethoxylated alkyl phenol comprises nonoxynol wherein the average number of ethylene oxide units per molecule is greater than or equal to 20. More preferably, the ethoxylated alkyl phenol comprises nonoxynol with an average number of ethylene oxide units per molecule in the range of approximately 20 to 50 with the most preferred range beng 30 to 40. Nonoxynol with a ratio of 20 to 50 has been found to be far less prone to causing stable oil-water emulsions and/or suspension in water than a nonoxynol with a ratio of less than 20, with a 30 to 40 ratio range being the best in this regard. A suitable nonoxynol can be formulated by ethoxylating nonyl phenol with NaOH catalyst at 150° C. and neutralizing the product with acetic acid. It is thought that neutralization with acetic acid may produce a better composition than other neutralizers. A suitable nonoxynol is also sold by Thompson-Hayward Company under the tradename T-DET-N-20 (where 20 indicates an average of 20 units of ethyline oxide per molecule).

The alcohol utilized in the liquid mixture of the present invention must be water soluble and can contain from 1 to 4 carbon atoms. It is chosen according to features such as solubility, freezing point reduction, effect as a wetting agent, etc. Suitable alcohols include methyl, isopropyl, n propyl, isobutyl, and n butyl. Most preferred is methyl alcohol since it is relatively inexpensive, very soluble in water and provides a suitable freezing point reduction.

The liquid mixture of the present invention is also preferably includes a bactericide to prevent bacterial growth in the composition and in the wellbore as the composition is used. A particularly suitable bactericide is an isothiazolin mixture sold by Rohm & Haas Company under the tradename Kathon WT. Another suitable bactericide is glutaraldehyde.

The liquid mixture of the present invention provides some corrosion inhibition without the addition of a corrosion inhibitor. However, it is often desirable to add a corrosion inhibitor to the mixture injected into the wellbore. A suitable corrosion inhibitor is sold by Baroid Company under the name Baroid MO533. Standard quantities of this corrosion inhibitor are compatible with the liquid mixture of the present invention.

The liquid mixture of the present invention can preferably include water as a carrier. The amount of water utilized can vary from relatively small amounts to as much as 80%. Of course, the freezing point of the composition is significantly affected by the percentage of water.

In order to prevent formation damage caused by precipitation of hard metal precipitates of calcium or magnesium it is desirable to adjust the pH to neutralize the composition prior to its use. This is especially important where sodium hydroxide is utilized in the ethoxylation process to form the ethoxylated alkyl phenols. Preferably, the pH is adjusted to the range of 6.5 to 7 by an acid such as acetic acid or hydrochloric acid.

Depending upon the desired use of the composition the ratios of the various components can be adjusted. The most desired ratio of alcohol to the ethoxylatd alkyl phenol is approximately 1 to 1. This provides the maximum synergistic effect between the two. Thus, the liquid mixture composition could contain from approximately 10 to 50% water soluble ethoxylated alkyl phenol, approximately 10 to 50% alcohol, an effective amount of bactericide (usually less than 2%), an effective amount of corrosion inhibitor (if desired) and the remainder water. More preferred is 10 to 30% each of the water soluble ethoxylated alkyl phenol and alcohol. One of the most preferred compositions comprises approximately 20% water soluble ethoxylated alkyl phenol and approximately 20% alcohol.

Most specifically, the most preferred composition of the present invention comprises approximately 20% nonoxynol having an average number of ethylene oxide units per molecule in the range of approximately 30 to 40, approximately 20% methyl alcohol, approximately 1 part per million Kathon WT and approximately 60% water. This composition has a freezing point of approximately $-30°$ F., is relatively inexpensive and provides the most desirable wetting and dispersion features with respect to treating a wellbore for removing the inhibiting paraffin accumulations.

To utilize the composition of the present invention for the treatment of wellbores, the composition can be continuously or intermittantly circulated in the wellbore to dissolve and disperse the paraffin and to treat the surfaces to prevent paraffin accumulation. Of course, the effective amounts of the liquid mixture to be circulated varies depending upon the amount of paraffin accumulated, the amount of paraffin in the crude, the production rate, the temperature of the wellbore and other factors.

For continuous treatment of wellbores the liquid composition can be circulated to the producing formation at a rate of approximately 50 to 500 parts per million based on the oil production. Circulation of the composition to the producing formation can be achieved by pumping it through the casing exterior of the production pipe.

For batch treatment of wellbores the composition can be added at the rate of 1 to 5 gallons every two weeks. This circulation can occur either during production or while production has ceased. Another form of batch treatment comprises squeezing the composition into the formation. In this treatment larger quantities (several gallons) are injected into the formation to be treated and the wellbore is pressurized to force the composition into the formation. In this manner, the formation zone about the wellbore, as well as the formation surface, is treated. Such treatment can repair wettability problems caused by other chemicals in addition to removing and inhibiting paraffin accumulations.

To illustrate the compositions and methods of the present invention the following examples are provided.

To utilize the composition of the present invention for squeeze treatment of well formation, the composition can be produced into the wellbore and then pressurized to drive the composition into formation. The pressure is maintained to hold the composition in the formation for sufficient time to allow paraffin to be removed from the formation and then the well is returned to production.

A sample squeeze procedure would require preparing the composition as described above and taking the well to be squeezed out of production. The well is then circulated clean using 75 barrels of hot water and 5 gallons of the composition of the present invention to remove paraffin. This is followed with 75 barrels of hot rinse water. Next, 110 gallons of the composition of the present invention heated to 180° F. is pumped into the tubing. The tubing is then displaced with 18 barrels of hot water containing 2% KCl. The introduction of hot water containing 2% KCl is continued until a desired pressure (less than 2000 psi) is achieved. The pressure is chosen according to the distance it is desired to drive the composition into the formation. Following the achievement of the desired pressure the well is shut in for 24 hours to allow the paraffin to be removed and suspended. The well is then returned to production. This removes the composition and suspended paraffin from the formation.

This squeeze treatment serves to heat up the producing zone which causes the precipitated paraffin to melt. The melted paraffin is prevented from redepositing by the composition of the present invention, which keeps the paraffin particles in solution and/or suspended as tiny particles that easily flow through the formation to the wellbore as the well continues to produce. The rate at which the composition of the present invention is displaced from the formation is dependent on the amount of water that flows by it. The higher the water production the faster the composition and suspended paraffin will be displaced.

It is particularly important that the squeeze treatment of the present invention leaves the producing zone water wet. It is also important that this squeeze treatment can be utilized in wells producing a wide ratio of oil to water.

EXAMPLE 1

Five samples containing 5 grams of waxy crude and 250 milliliters of tap water are prepared in 500 milliliter glass flasks labelled A through E. The control sample, sample A, is set aside. To sample B is added 0.25 grams of Thompson-Hayward T-DET N-20. To sample C is added 0.125 grams of Thompson-Hayward T-DET N-20.

For samples D and E an additive composition in accordance with the present invention, i.e., a composition of 20 weight percent Thompson-Hayward T-DET N-20, 20 weight percent methyl alcohol, 1 part per million Kathon WT and approximately 60% water is prepared. 0.25 grams of this liquid mixture are added to sample D and 0.125 grams are added to sample E.

Following preparation, the samples are periodically examined for four days. Sample A immediately separates into a black waxy crude accumulated on the upper part of the flask with clear water separated below. Samples B and C show less black waxy crude accumulated on the walls of the flask compared to sample A but both show a considerable amount of black waxy crude attached to the walls. Samples B and C also show fairly dirty water below the back waxy crude line indicating that some of the crude is dispersed in the water. Samples D and E show little or no black waxy deposit on the upper part of the flask and the oil on sample D is water coated and none of it is adhering to the walls of the flask. With sample E a very small amount of waxy oil is adhering to the surface of the flask. With both samples D and E the water below the oil initially appeared dirty but cleared faster than the water did in samples B and C.

These examples indicate that the water soluble ethoxylated alkyl phenol and the alcohol act synergistically to improve the dispersant and surface wetting features compared to alcohol or water soluble nonoxynol used separately.

EXAMPLE 2

Similar flask tests are performed utilizing ethoxylated alkyl phenols made by ethoxylating nonyl phenol with NaOH catalyst at 150° C. The products are neutralized with acetic acid. Tests are performed with compositions in accordance with the present invention including 20% of the prepared ethylene oxide adducts of nonyl phenol, 20% methyl alcohol, one part per million Kathon WT and approximately 60% water. Separate tests are performed for such compositions with 20 mole, 30 mole, 40 mole and 50 mole ethylene oxide adducts of nonyl phenol. Also, separate tests are provided utilizing 0.25 grams of this mixture and 0.125 grams of this mixture.

Using the same procedures as described in Example 1, it was found that the wax particle size with the 40 mole, 0.25 gram addition was the same as the particle size with the 20 mole, 0.125 gram addition. With the 40 mole compositions, the flask wall fouling was not observed at 0.25 gram addition whereas with the 20 mole composition, appreciable fouling occurred at 0.25 gram compositions. In these experiments, the 30 and 40 mole compositions give about the same results, and are superior.

EXAMPLE 3

An emulsion bottle test is performed utilizing the 20 mole and 40 mole compositions in accordance with the present invention as described in Example 2. These tests reveal that the 40 mole composition does not form a stable emulsion while a 20 mole composition does form a stable emulsion. The 40 mole is therefore preferred.

EXAMPLE 4

Two wells with sufficient paraffin deposition to require conventional hot oil treatment monthly are treated by circulating the composition of present invention described in Example 1 in the wellbores of each. Small pumps at the wellsite inject 100 parts per million of the composition based on the oil production through the casings to the producing formations as the wells are producing. The first well has a production of 40 barrels per day of oil and 92 barrels of water. The second well has a production of 100 barrels of oil per day and 50 barrels of water. With each well the frequency of hot oil treatment is reduced to 6 to 9 months or longer indicating substantial inhibition of paraffin deposition. The rate of production from each well indicates that the formation and tubing remain clean and water wet.

Thus, the methods and compositions of the present invention are well adapted to attain the objects and advantages mentioned as well as those inherent therein. While presently preferred embodiments of the invention have been described for the purpose of this disclosure, numerous changes in the details and method steps and the composition can be made by those skilled in the art which changes are encompassed within the spirit of the invention as defined by the appended claims.

The foregoing disclosure and the showings made in the examples are merely illustrative of the principles of this invention and are not to be interpreted in a limiting sense.

The embodiments of the invention in which an exclusive property or privilege is claimed are defined as follows:

1. A process for treating a wellbore for inhibiting and removing accumulations of paraffin, comprising:
    circulating in said wellbore a liquid mixture consisting essentially of approximately equal amounts of a water soluble alcohol containing 1 to 4 carbon atoms and a water soluble ethoxylated nonyl phenol having an average number of ethylene oxide units per molecule in the range of approximately 30 to 40 and up to 80 weight percent of water, said alcohol and ethoxylated nonyl phenol each being present in an amount of 10 to 50 weight pecent.

2. The process of claim 1 wherein said liquid mixture consists essentially of approximately 20 weight percent of said alcohol, 20 weight percent of said water soluble ethoxylated nonyl phenol and approximately 60 weight percent water.

3. The process of claim 1 wherein said mixture has a pH in the range of approximately 6.5 to 7.0.

4. The process of claim 1 wherein said alcohol is methyl alcohol.

5. The process of claim 1 wherein said mixture further contains a bactericide.

6. The process of claim 1 wherein said mixture further contains a corrosion inhibitor.

7. A process for treating a well formation for inhibiting and removing accumulations of paraffin, comprising:
    pumping into the wellbore a liquid mixture consisting essentially of approximately equal amounts of an alcohol containing 1 to 4 carbon atoms and a water soluble ethoxylated nonyl phenol having an average number of ethylene oxide units per molecule in the range of approximately 20 to 50 and up to 80 weight percent of water, said alcohol and ethoxylated nonyl phenol each being present in an amount of 10 to 50 weight percent;
    pressurizing the liquid mixture in the wellbore to force the liquid mixture into the well formation; and
    removing the mixture from the well formation.

8. The process of claim 7 wherein said liquid mixture consists essentially of approximately 20 weight percent of said alcohol, 20 weight percent of said water soluble ethoxylated nonyl phenol and approximately 60 weight percent water.

9. The process of claim 8 wherein said ethoxylated noxylphenol has an average number of ethylene oxide units per molecule in the range of approximately 30 to 40.

10. The process of claim 7 wherein said mixture has a pH in the range of approximately 6.5 to 7.0.

11. The process of claim 7 wherein said alcohol is methyl alcohol.

* * * * *